(12) United States Patent
Sugawara et al.

(10) Patent No.: US 7,965,800 B2
(45) Date of Patent: Jun. 21, 2011

(54) CLOCK RECOVERY APPARATUS

(75) Inventors: Hiroshi Sugawara, Musashino (JP);
Katsuya Ikezawa, Musashino (JP);
Toshiaki Kobayashi, Musashino (JP);
Yasukazu Akasaka, Musashino (JP);
Akira Toyama, Musashino (JP);
Toshimichi Suzuki, Musashino (JP);
Hirotoshi Kodaka, Musashino (JP);
Tsuyoshi Yakihara, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 651 days.

(21) Appl. No.: 12/037,683

(22) Filed: Feb. 26, 2008

(65) Prior Publication Data
US 2008/0205564 A1 Aug. 28, 2008

(30) Foreign Application Priority Data
Feb. 28, 2007 (JP) ................................ 2007-049027

(51) Int. Cl.
*H04L 7/00* (2006.01)
(52) U.S. Cl. ........ 375/354; 375/373; 375/376; 327/141; 327/147; 327/156; 455/260
(58) Field of Classification Search .................. 375/354, 375/373, 376; 327/141, 147, 156; 455/260
See application file for complete search history.

(56) References Cited

U.S. PATENT DOCUMENTS

| 5,237,290 | A  | * | 8/1993 | Banu et al. ...................... 331/2 |
| 6,018,273 | A  |   | 1/2000 | Tsyrganovich |
| 6,208,183 | B1 | * | 3/2001 | Li et al. ........................ 327/161 |
| 6,259,326 | B1 | * | 7/2001 | Dunlop et al. ................... 331/2 |
| 7,522,686 | B2 | * | 4/2009 | Nam et al. ..................... 375/355 |
| 7,667,544 | B2 | * | 2/2010 | Sugawara et al. ............. 331/1 A |
| 7,734,000 | B2 | * | 6/2010 | Kuo et al. ..................... 375/375 |

FOREIGN PATENT DOCUMENTS
JP 08213979 A 8/1996

OTHER PUBLICATIONS

Yusuke Ota et al., "High-Speed, Burst-Mode, Packet-Capable Optical Receiver and Instantaneous Clock Recovery for Optical Bus Operation", Journal of Lightwave Technology, Feb. 2004, pp. 325-331, vol. 12, No. 2.

Yusuke Ota et al., "High-Speed, Burst Mode, Packet-Capable Optical Receiver and Instantaneous Clock Recovery for Optical Bus Operation", Journal of Lightwave Technology, Feb. 1994, pp. 325-331, vol. 12, No. 2.

* cited by examiner

*Primary Examiner* — Leon Flores
(74) *Attorney, Agent, or Firm* — Sughrue Mion, PLLC

(57) ABSTRACT

A clock recovery apparatus for generating a recovery clock from received data may include, but is not limited to, first and second oscillators. The first oscillator generates a first signal having a first frequency. The first signal synchronizes with the received data when the received data has a first level. The second oscillator is connected in series to the first oscillator. The second oscillator generates a second signal as the recovery clock when the first signal has a second level. The second signal has a second frequency. The second signal synchronizes with the first signal.

9 Claims, 3 Drawing Sheets

CLOCK RECOVERY APPARATUS

BACKGROUND OF THE INVENTION

1. Field of the Invention

The present invention generally relates to a clock recovery apparatus that generates a recovery clock for receiving data from received data.

Priority is claimed on Japanese Patent Application No. 2007-49027, filed Feb. 28, 2007, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

FIG. 5 is a block diagram illustrating the configuration of a conventional clock recovery apparatus. A conventional clock recovery apparatus 100 includes a first oscillator 101, a second oscillator 102, an inverter circuit 103, an OR-gate 104, a D-flip-flop 105, and a frequency controller 106. The first oscillator 101 has a reset terminal Reset that receives an input of received data D101. The inverter circuit 103 receives the input of received data D101 and generates the inverted data. The second oscillator 102 is placed in parallel to the first oscillator 101. The second oscillator 102 has a reset terminal Reset that receives the inverted data from the inverter circuit 103.

The first oscillator 101 is configured to generate a first output signal having a predetermined first frequency from an output terminal Q when the received data D101 is high-level (H). The first oscillator 101 is configured to discontinue oscillation when the received data D101 is low-level (L). The second oscillator 102 is configured to generate a second output signal having a predetermined second frequency from an output terminal Q when the received data D101 is low-level (L). The second oscillator 102 is configured to discontinue oscillation when the received data D101 is high-level (H).

The OR-gate 104 has first and second input terminals that are connected to the outputs Q of the first and second oscillators 101 and 102. The OR-gate 104 receives the first and second output signals from the first and second oscillators 101 and 102. The OR-gate 104 performs a logic-OR operation of the first and second output signals from the first and second oscillators 101 and 102, and generates a recovery clock CK101 as the result of the logic-OR operation. The recovery clock CK101 is synchronized with the received data D101.

The D-flip-flop 105 has a D-input terminal that receives the received data D101. The D-flip-flop 105 has a clock terminal that receives the recovery clock CK101 from the output of the OR-gate 104. The D-flip-flop 105 generates a recovery data D102 from the received data D101 and the recovery clock CK101. The frequency controller 106 receives the first and second output signals from the first and second oscillators 101 and 102 and a reference clock signal RC101. The frequency controller 106 controls oscillation frequencies of the first and second oscillators 101 and 102 based on the three input signals, for example, the first and second output signals from the first and second oscillators 101 and 102 and the reference clock signal RC101. The frequency controller 106 controls oscillation frequencies of the first and second oscillators 101 and 102 so that the first and second output signals from the first and second oscillators 101 and 102 have the same frequency.

Operations of the conventional clock recovery apparatus 100 will be described, assuming that the first and second output signals from the first and second oscillators 101 and 102 have the same frequency. Detailed descriptions of the control by the frequency controller 106 will be omitted.

The received data D101 is input into the clock recovery apparatus 100. The received data D101 is input into the reset terminal of the first oscillator 101. The received data D101 is input into the inverter circuit 103. The received data D101 is inverted into the inverted data by the inverter circuit 103. The inverted data is then input into the reset terminal Reset of the second oscillator 102. When the received data D101 is high-level (H), the first oscillator 101 generates the first output signal having the predetermined first frequency from the output terminal Q, while the second oscillator 102 discontinues oscillation. The first output signal having the predetermined first frequency from the output terminal Q of the first oscillator 101 is input into the first input terminal of the OR-gate 104. When the received data D101 is low-level (L), the second oscillator 102 generates the second output signal having the predetermined second frequency from the output terminal Q, while the first oscillator 101 discontinues oscillation. The second output signal having the predetermined second frequency from the output terminal Q of the second oscillator 102 is input into the second input terminal of the OR-gate 104. The OR-gate 104 generates the recovery clock CK101 as the result of the logic-OR operation. The received data D101 and the recovery clock CK101 are input into the D-flip-flop 105. The D-flip-flop 105 outputs the recovery data D102.

As described above, the conventional clock recovery apparatus 100 allows the first and second oscillators 101 and 102 to perform selective operation in accordance with the level of the received data D101, thereby continuously generating the recovery clock CK101.

The details of the above-described conventional clock recovery apparatus 100 is disclosed by Yusuke Ota, Robert G. Swartz, Vance D. Archer, Steven K. Korotky, Mihai Banu, Alfred E. Dunlop, "High Speed, Burst-Mode, Packet-Capable Optical Receiver and Instantaneous Clock Recovery for Optical Bus Operation" Journal of Lightwave Technology, February 1994, vol. 12, No. 2, p-325.

In recent years, a high speed optical communication line such as Synchronous Optical NETwork/Synchronous Digital Hierarchy (SONET/SDH), in order to realize higher transmission speed and larger channel capacity. In some cases, Ethernet can be used as a local area network. Ethernet of 1 Gbps or more has been wide-spread. Such high speed communication line needs a clock recovery apparatus that is capable of generating recovery clock stably for high bit rate data.

The conventional clock recovery apparatus 100 is configured to selectively operate the first and second oscillators 101 and 102 in accordance with the level of the received data D101, wherein the first and second oscillators 101 and 102 are connected in parallel to each other with reference to the input into which the received data D101 is input. A difference in the delay time between the first and second oscillators 101 and 102 deteriorates the stability of high speed performance of the conventional clock recovery apparatus 100. The difference in the delay time between the first and second oscillators 101 and 102 may cause that the first and second oscillators 101 and 102 output the first and second output signals simultaneously at a time of switching one to another of the first and second oscillators 101 and 102. The first and second output signals that have been simultaneously output from the first and second oscillators 101 and 102 are input into the OR-gate 104. The recovery clock CK101 output from the OR-gate 104 has a part having a longer frequency. An error may occur on the recovery data D102 that is output from the D-flip-flop 105.

In view of the above, it will be apparent to those skilled in the art from this disclosure that there exists a need for an improved clock recovery apparatus. This invention addresses this need in the art as well as other needs, which will become apparent to those skilled in the art from this disclosure.

SUMMARY OF THE INVENTION

Accordingly, it is a primary object of the present invention to provide a clock recovery apparatus.

It is another object of the present invention to provide a clock recovery apparatus that can exhibit stable and high speed performance.

In accordance with a first aspect of the present invention, a clock recovery apparatus for generating a recovery clock from received data may include, but is not limited to, first and second oscillators. The first oscillator generates a first signal having a first frequency. The first signal synchronizes with the received data when the received data has a first level. The second oscillator is connected in series to the first oscillator. The second oscillator generates a second signal as the recovery clock when the first signal has a second level. The second signal has a second frequency. The second signal synchronizes with the first signal.

In some cases, the second frequency may be identical with the first frequency.

In some cases, the clock recovery apparatus may further include a frequency divider, and a multiplier. The frequency divider divides the frequency of the received data at a dividing ratio. The frequency divider supplies the received data of the divided frequency to the first oscillator. The multiplier multiplies the second signal at a multiplying ratio which is decided depending upon the dividing ratio.

In some cases, the first and second frequencies may be equal to or higher than a third frequency that is obtained by dividing the frequency of the received data by the dividing ratio.

In some cases, the first oscillator may include a first ring oscillator with a first reset terminal which receives an input of the received data. The second oscillator may include a second ring oscillator with a second reset terminal which receives an input of a third signal that is output from an inverting output terminal of the first oscillator.

In some cases, the clock recovery apparatus may further include a frequency controller that controls the frequency of each of the first and second signals based on the second signal and a reference clock that is externally given.

The second oscillator is connected in series to the first oscillator. The first oscillator generates a first signal synchronizing with the received data when the received data has a first level. The second oscillator generates a second signal as the recovery clock synchronizing with the first signal when the first signal has a second level. Even if there is a difference in delay between the first and second oscillators, then the clock recovery apparatus exhibits stable and high speed performances.

These and other objects, features, aspects, and advantages of the present invention will become apparent to those skilled in the art from the following detailed descriptions taken in conjunction with the accompanying drawings, illustrating the embodiments of the present invention.

BRIEF DESCRIPTION OF THE DRAWINGS

Referring now to the attached drawings which form a part of this original disclosure.

DETAILED DESCRIPTION OF THE INVENTION

Selected embodiments of the present invention will now be described with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
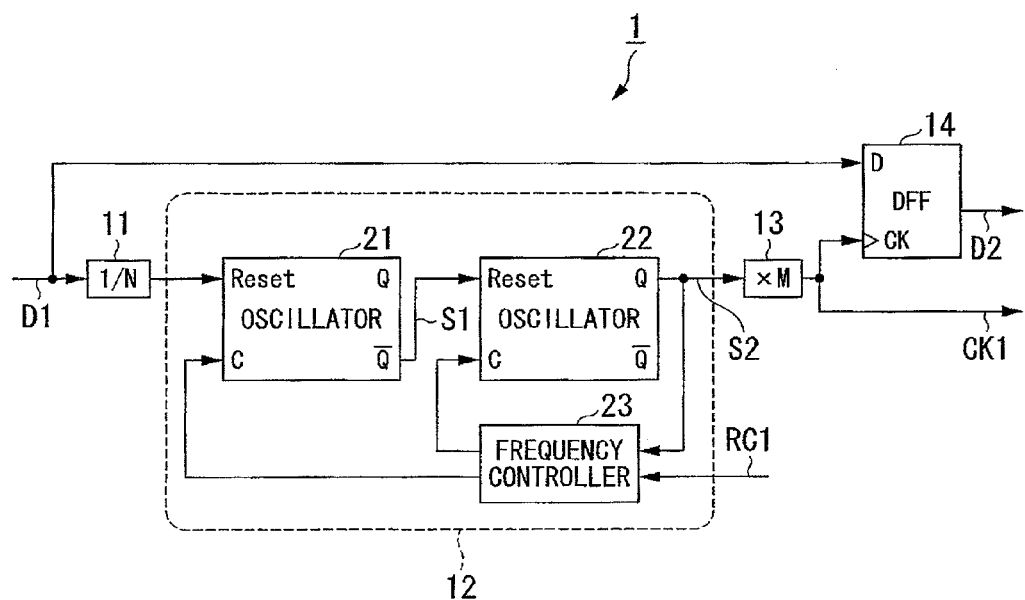
FIG. 1 is a block diagram illustrating a clock recovery apparatus in accordance with a first embodiment of the present invention.

FIG. 1 is a block diagram illustrating a clock recovery apparatus in accordance with a first embodiment of the present invention. A clock recovery apparatus 1 may include, but is not limited to, a frequency divider 11, a recovery clock generator 12, a multiplier 13, and a D-flip-flop 14. The clock recovery apparatus 1 may be configured to receive received data D1 and generate a recovery clock CK1 and a recovery data D1. The clock recovery apparatus 1 may be configured to be responsible to a wide range of data transmission rate of the received data D1. A typical example of the wide range of data transmission rate may be between, but is not limited to, a low data transmission rate of a few Mbps and a high data transmission rate of several tens Mbps. The following descriptions will be made by taking an example that the received data D1 has a data transmission rate of 10 Gbps.

The frequency divider 11 may be provided in the previous-stage of the recovery clock generator 12. The frequency divider 11 may be configured to receive the received data D1 and divides the frequency of the received data D1 with a predetermined frequency dividing ratio N, where N is the integer which is not less than 1. The frequency divider 11 may be configured to generate frequency-divided data D1. In order to simplify the explanation, it is assumed that the frequency dividing ratio N is set "1".

The recovery clock generator 12 may be configured to receive the frequency-divided data D1 from the frequency divider 11 and generate a recovery clock signal based on the frequency-divided data D1. The recovery clock generator 12 may include, but is not limited to, first and second oscillators 21 and 22 and a frequency controller 23. The first oscillator 21 may be configured to receive the frequency-divided received data D1 from the frequency divider 11. The first oscillator 21 may be configured to generate a first signal S1 of a first frequency which synchronizes with the frequency-divided received data D1 when the frequency-divided received data D1 has a predetermined level. The second oscillator 22 may be connected in series to the first oscillator 21. The second oscillator 22 may be configured to receive the first signal S1 from the first oscillator 21. The second oscillator 22 may be configured to generate a second signal S2 of a second frequency which synchronizes with the first signal S1 when the first signal S1 has a predetermined level. The second oscillator 22 outputs the second signal S2 as an output signal of the recovery clock generator 12. The multiplier 13 may be configured to receive the second signal S2 from the second oscillator 22. The multiplier 13 may be configured to multiply the second signal S2 and generates a recovery clock signal CK1.

Figure 2:
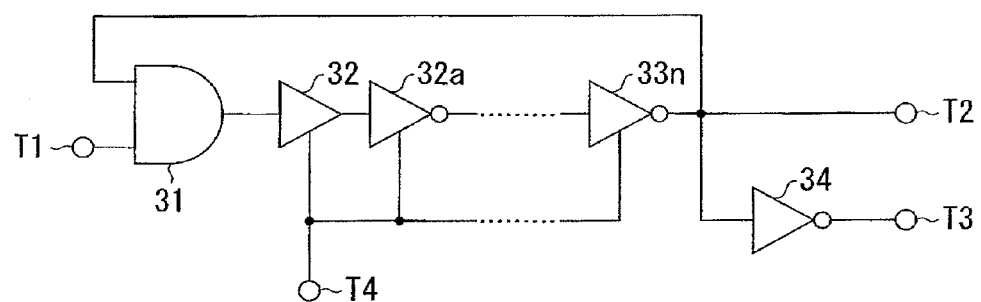
FIG. 2 is a circuit diagram illustrating the configuration of each of first and second oscillators included in the clock recovery apparatus shown in FIG. 1.

The first and second oscillators 21 and 22 will be described in detail. FIG. 2 is a circuit diagram illustrating the configuration of each of the first and second oscillators 21 and 22 included in the clock recovery apparatus 1 shown in FIG. 1. The first and second oscillators 21 and 22 may each have the following configuration. Each of the first and second oscillators 21 and 22 may include, but is not limited to, an AND-gate 31, a buffer circuit 32, a series connection of the odd number of inverter circuits 33a, ..., 33n, and an inverter circuit 34. The AND-gate 31 has first and second input terminals, wherein the first input terminal T1 performs as the above-described reset terminal "Reset" of each of the first and second oscillators 21 and 22. The buffer circuit 32 has an input terminal that is connected to the output terminal of the AND-gate 31. The buffer circuit 32 has an output terminal that is connected to the first stage of the series connection of the odd number of inverter circuits 33a, ..., 33n. The final stage of the series connection of the odd number of inverter circuits 33a, ..., 33n has an output terminal that is connected to the second input terminal of the AND-gate 31. This circuit configuration forms a ring-oscillator combined with a reset circuit.

The inverter circuit 33n on the final stage of the series connection has an output terminal that is connected to a terminal T2 and the input terminal of the inverter circuit 34. The inverter circuit 34 has an output terminal that is connected to a terminal T3. The terminal T2 performs as the non-inverting output Q of each of the first and second oscillators 21 and 22. The terminal T3 performs as the inverting output Q (hereinafter referred to as Q-bar) of each of the first and second oscillators 21 and 22. The series connation of the buffer circuit 32 and the odd number of inverter circuits 33a, ..., 33n constitutes a part of the ring oscillator. The final stage of the series connection of the odd number of inverter circuits 33a, ..., 33n is connected to the terminal T2. The terminal T2 performs as a frequency control signal input terminal C of each of the first and second oscillators 21 and 22. The terminal T2 as the frequency control signal input terminal C receives the frequency control signal from the frequency controller 23.

Upon input of the high level (H-level) input signal into the terminal T1, the AND-gate 31 is placed into the open-state, so that the output terminal of the final stage inverter circuit 33n is electrically connected to the input terminal of the buffer circuit 32 through the AND-gate 31, thereby allowing the ring oscillator to oscillate. An output signal appears on the terminal T2, wherein the output signal has a frequency, which depends on the number of stages of the series connection of inverter circuits 33a, ..., 33n. The output signal is also input into the inverter circuit 34. The output signal is inverted by the inverter circuit 34 and the inverted output signal will appear on the terminal T3.

Upon input of the low level (L-level) input signal into the terminal T1, the AND-gate 31 is placed into the closed-state, so that the output terminal of the final stage inverter circuit 33n is electrically disconnected from the input terminal of the buffer circuit 32 by the AND-gate 31, thereby inhibiting the ring oscillator from oscillating.

The second signal S2 output from the second oscillator 22 is set to be identical or similar in the frequency to the first signal S1 output from the first oscillator 21. What the second signal S2 is similar in the frequency to the first signal S1 means that the second frequency of the second signal S2 is not exactly identical to and may be slightly different from the first frequency of the first signal S1. Such difference may be caused by the error of the circuit. The frequency of the first and second signals S1 and S2 output from the first and second oscillators 21 and 22 is set to be not lower than a frequency that is obtained by dividing the frequency of the received data D1 by the frequency dividing ratio N of the frequency divider 11. If for example the received data D1 has a frequency of 10 Gbps and the frequency divider 11 has a frequency dividing ratio N of 1, then the frequency of the first and second signals S1 and S2 is set to be not less than 10 GHz. for example the received data D1 has a frequency of 10 Gbps and the frequency divider 11 has a frequency dividing ratio N of 2, then the frequency of the first and second signals S1 and S2 is set to be not less than 5 GHz.

With reference to FIG. 1, the output terminal of the frequency divider 11 is connected to the reset terminal "Reset" of the first oscillator 21. The inverting output Q-bar of the first oscillator 21 is connected to the reset terminal "Reset" of the second oscillator 22. The first oscillator 21 is controlled in oscillation by the received data D1 which has been transmitted through the frequency divider 11. The second oscillator 22 is controlled in oscillation by the first signal S1 output from the first oscillator 21. The second oscillator 22 outputs the second signal S2 from its non-inverting output terminal Q.

The frequency controller 23 may be configured to receive the second signal S2 output from the non-inverting output terminal Q of the second oscillator 22. The frequency controller 23 may also be configured to receive a reference clock RC1 that is supplied externally. The frequency controller 23 may be configured to control the oscillation frequencies of the first and second oscillators 21 and 22 based on the second signal S2 and the reference clock RC1. In some cases, the frequency controller 23 may be configured to control the oscillation frequencies of the first and second oscillators 21 and 22 so that the frequencies of the first and second signals S1 and S2 from the first and second oscillators 21 and 22 become identical to each other. The frequency controller 23 may be configured to control the oscillation frequencies of the first and second oscillators 21 and 22 so that the frequencies of the first and second signals S1 and S2 from the first and second oscillators 21 and 22 become identical to each other even if the oscillation frequencies of the first and second oscillators 21 and 22 vary depending on temperature variation.

The multiplier 13 is provided in the follower stage of the second oscillator 22. The multiplier 13 may be configured to receive the second signal S2 and multiply the second signal S2 with a multiplying ratio M. The multiplying ratio M may be decided depending upon the frequency dividing ratio N of the frequency divider 11. If the frequency dividing ratio N of the frequency divider 11 is set to be 1, the multiplying ratio M of the multiplier 13 is set to be 1. If the frequency dividing ratio N of the frequency divider 11 is set to be 2, the multiplying ratio M of the multiplier 13 is set to be 2. Indeed, when the frequency of the received data D1 is divided by the frequency divider 11 into 1/N, the frequency of the second signal S2 output from the second oscillator 22 is multiplied by M-times by the multiplier 13. In order to simplify the explanation, the multiplying ratio M of the multiplier 13 is set 1.

The second signal S2 output from the second oscillator 22 is multiplied by the multiplier 13, thereby generating the recovery clock CK1. The D-flip-flop 14 has a D-input that is configured to receive the received data D1. The D-flip-flop 14 also has a clock terminal CK that is configured to receive the recovery clock CK1 output from the multiplier 13. The D-flip-flop 14 is configured to generate a recovery data D2 based on the received data D1 and the recovery clock CK1.

Figure 3:
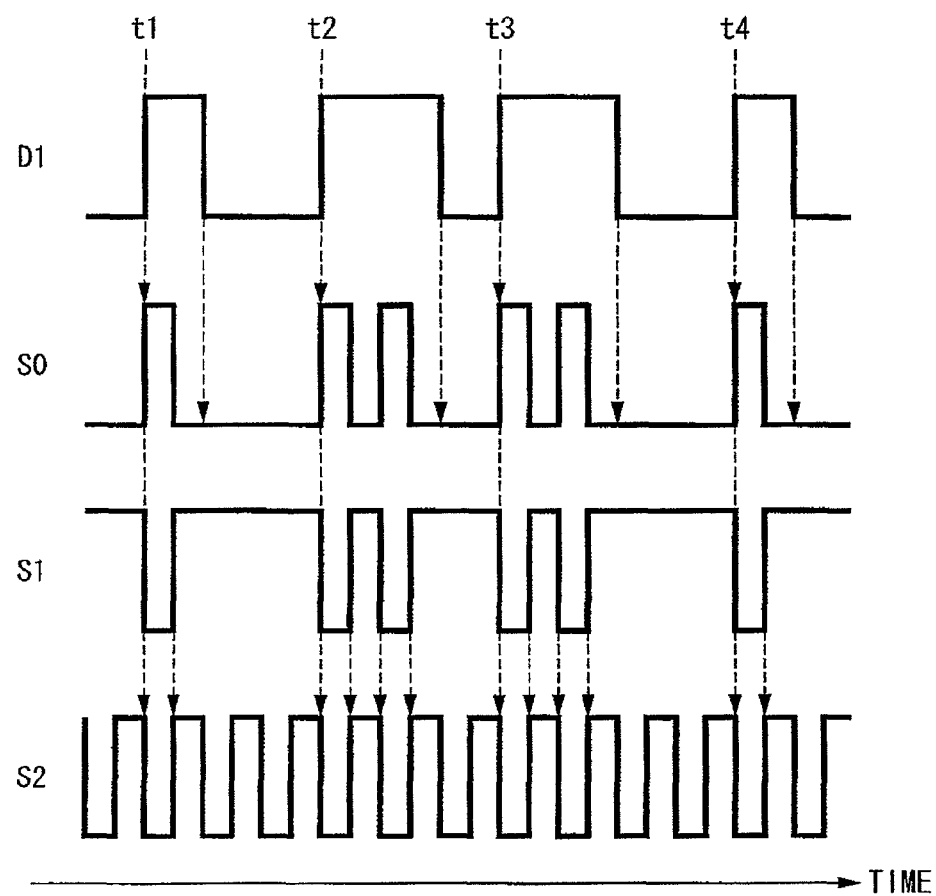
FIG. 3 is a timing chart illustrating operations of the clock recovery apparatus 1 shown in FIG. 1.

Operations of the clock recovery apparatus 1 shown in FIG. 1 will be described. FIG. 3 is a timing chart illustrating operations of the clock recovery apparatus 1 shown in FIG. 1. In FIG. 3, D1 represents the received data D1 described above. SO represents a signal output from the non-inverting output terminal Q of the first oscillator 21. S1 represents the above-described first signal output from the inverting output terminal Q-bar of the first oscillator 21. S2 represents the above-described second signal output from the non-inverting output terminal Q of the second oscillator 22.

Upon input of the received data D1 having the frequency of 10 Gbps into the clock recovery apparatus 1, the received data D1 is transmitted through the frequency divider 11 to the reset terminal "Reset" of the first oscillator 21 in the recovery clock generator 12. In this case, the frequency dividing ratio N of the frequency divider 11 is set 1 so that the received data D1 is input into the reset terminal "Reset" of the first oscillator 21.

When the received data D101 of high-level (H-level) is input into the reset terminal "Reset" of the first oscillator 21, the AND-gate 31 is placed into the open-state, so that the output terminal of the final stage inverter circuit 33n is electrically connected to the input terminal of the buffer circuit 32 through the AND-gate 31, thereby allowing the ring oscillator to oscillate. An output signal SO is output from the non-inverting output terminal Q of the first oscillator 21, wherein the output signal SO has a frequency of 10 GHz, which depends on the number of stages of the series connection of inverter circuits 33a, . . . , 33n. Another output signal S1 as the first signal is output from the inverting output terminal Q-bar of the first oscillator 21.

As shown in FIG. 3, the received data D1 has rising edges at times t1, t2, t3, and t4. The received data D1 keeps the high level for one period after rising at each of the times t1 and t4. The received data D1 also keeps the high level for two periods after rising at each of the times t2 and t3. The output signal SO of a frequency 10 GHz is output from the non-inverting output terminal Q of the first oscillator 21. The output signal SO keeps the high level for one period after rising at each of the times t1 and t4. The output signal SO also keeps the high level for two periods after rising at each of the times t2 and t3. The output signal SO is a pulse signal which synchronizes with the received data D1 at each of the times t1, t2, t3 and t4.

When the received data D101 of low-level (L-level) is input into the reset terminal "Reset" of the first oscillator 21, the AND-gate 31 is placed into the closed-state, so that the output terminal of the final stage inverter circuit 33n is electrically disconnected from the input terminal of the buffer circuit 32 by the AND-gate 31, thereby inhibiting the ring oscillator from oscillating. The output signal SO is not output from the non-inverting output terminal Q of the first oscillator 21. In other words, the output signal SO is kept low level (L-level).

The first signal S1 is output from the inverting output terminal Q of the oscillator 21. The first signal S1 is the logical inversion of the signal SO that is output from the non-inverting output terminal Q-bar of the oscillator 21. The first signal S1 is a negative pulse signal of 10 GHz, when the received data D1 is high-level (H-level). The first signal S1 has falling edges synchronizing with the rising edges of the received data D1 at the times t1, t2, t3 and t4. The first signal S1 is kept at high-level, when the received data D1 is low-level (L-level).

The first signal S1 output from the non-inverting output terminal Q-bar of the oscillator 21 is then input into the reset terminal Reset of the second oscillator 22. When the first signal S1 input into the reset terminal Reset of the second oscillator 22 is low-level (L-level), the AND-gate 31 is placed in the closed state, so that the output terminal of the final stage inverter circuit 33n is electrically disconnected from the input terminal of the buffer circuit 32 by the AND-gate 31, thereby inhibiting the ring oscillator from oscillating. Falling transition of the first signal S1 from the high level (H-level) to the low level (L-level) causes falling transition of the second signal S2 from the high level (H-level) to the low level (L-level).

As shown in FIG. 3, the first signal S1 has falling edges synchronizing with the rising edges of the received data D1 at the times t1, t2, t3 and t4. The first signal S1 also has falling edges at times after one-period thereof from the times t2 and t3. The second signal S2 output from the non-inverting output terminal Q-bar of the oscillator 21 shows falling transition from the high level (H-level) to the low level (L-level) at each time when the first signal S1 is transitioned from the high level (H-level) to the low level (L-level) at the times after one-period thereof from the times t2 and t3.

When the first signal S1 input into the reset terminal Reset of the second oscillator 22 is high-level (H-level), the AND-gate 31 is placed in the open state, so that the output terminal of the final stage inverter circuit 33n is electrically connected to the input terminal of the buffer circuit 32 through the AND-gate 31, thereby allowing the ring oscillator to oscillate. The second signal S2 is output from the non-inverting output terminal Q of the second oscillator 22, wherein the second signal S2 has a frequency of 10 GHz, which depends on the number of stages of the series connection of inverter circuits 33a, . . . , 33n.

The ring oscillator of the second oscillator 22 oscillates every time the first signal S1 input into the reset terminal Reset of the second oscillator 22 is transitioned from the low level (L-level) to the high level (H-level). The second signal S2 output from the non-inverting output terminal Q of the second oscillator 22 is transitioned from the low level (L-level) to the high level (H-level) every time the first signal S1 input into the reset terminal Reset of the second oscillator 22 is transitioned from the low level (L-level) to the high level (H-level). The ring oscillator is permitted to oscillate when the first signal S1 has the high level (H-level), and the second signal of the frequency of 10 GHz is continued out to output from the non-inverting output terminal Q of the second oscillator 22.

The second signal S2 of 10 GHz is output from the non-inverting output terminal Q of the second oscillator 22, wherein the second signal S2 is transitioned between high and low levels in synchronizing with the rising and falling transitions of the first signal S1. The second oscillator 22 is then input into the multiplier 13, thereby generating the recovery clock CK1. In this embodiment, the multiplying ratio M of the multiplier 13 is set at 1. The multiplier 13 receives the second signal S2 and then outputs the second signal S2 as the recovery clock CK1. The received data D1 is input into the D-input of the D-flip-flop 14. The recovery clock CK1 is input into the clock terminal CK of the D-flip-flop 14. The D-flip-flop 14 outputs the received data as the recovery data D2 every time the recovery clock CK1 is input into the clock terminal CK of the D-flip-flop 14.

Figure 4:
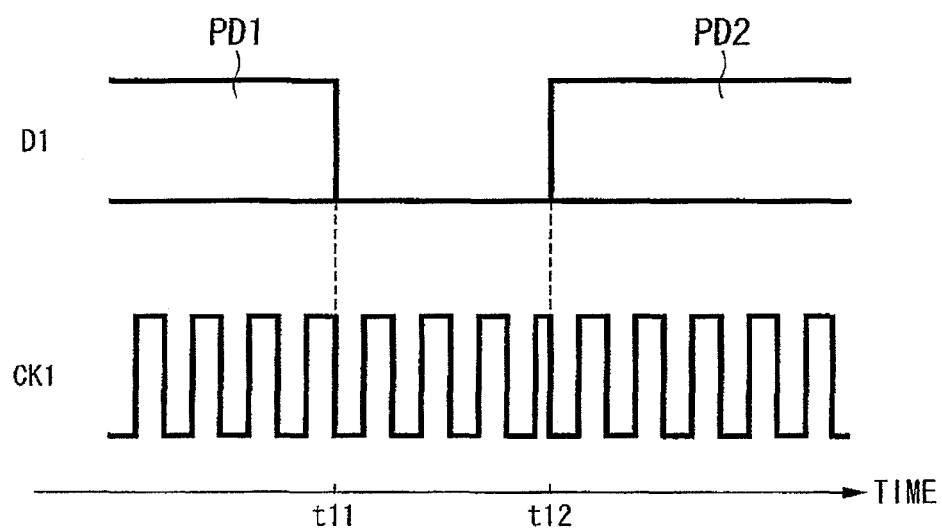
FIG. 4 is a diagram showing one example of a recovery clock output from a clock recovery apparatus shown in FIG. 1 when received data is nonsynchronous packet data.

Operations of the clock recovery apparatus when the received data D1 is nonsynchronous packet data will be described. FIG. 4 is a diagram showing one example of the recovery clock CK1 output from the clock recovery apparatus shown in FIG. 1 when the received data D1 is nonsynchronous packet data. As shown in FIG. 4, the received data D1 is a first packet data PD1 prior to a time t11. The received data D1 is a second packet data PD2 which does not synchronizes with the first packet data PD1 after a time t12 which is later by a predetermined time period than the time t11.

When the received data D1 is the first packet data PD1 before the time t11, the clock recovery apparatus 1 generates the recovery clock CK1 which synchronizes with the first packet data PD1. The input of the packet data PD1 is terminated at the time t11. In the time period between the times t11 and t12, the clock recovery apparatus 1 generates the recovery clock CK1 having a constant frequency of 10 GHz, which synchronizes with the falling edge of the first packet data PD1 at the time t11.

Input of the second packet data PD2 into the clock recovery apparatus 1 is initiated at the time t12. After the time t12, the clock recovery apparatus 1 generates the recovery clock CK1 which synchronizes with the second packer data PD2. As described above, the clock recovery apparatus 1 can generate the recovery clock CK1 which is continuous and synchronizes with the nonsynchronous data as the received data D1.

Figure 5:
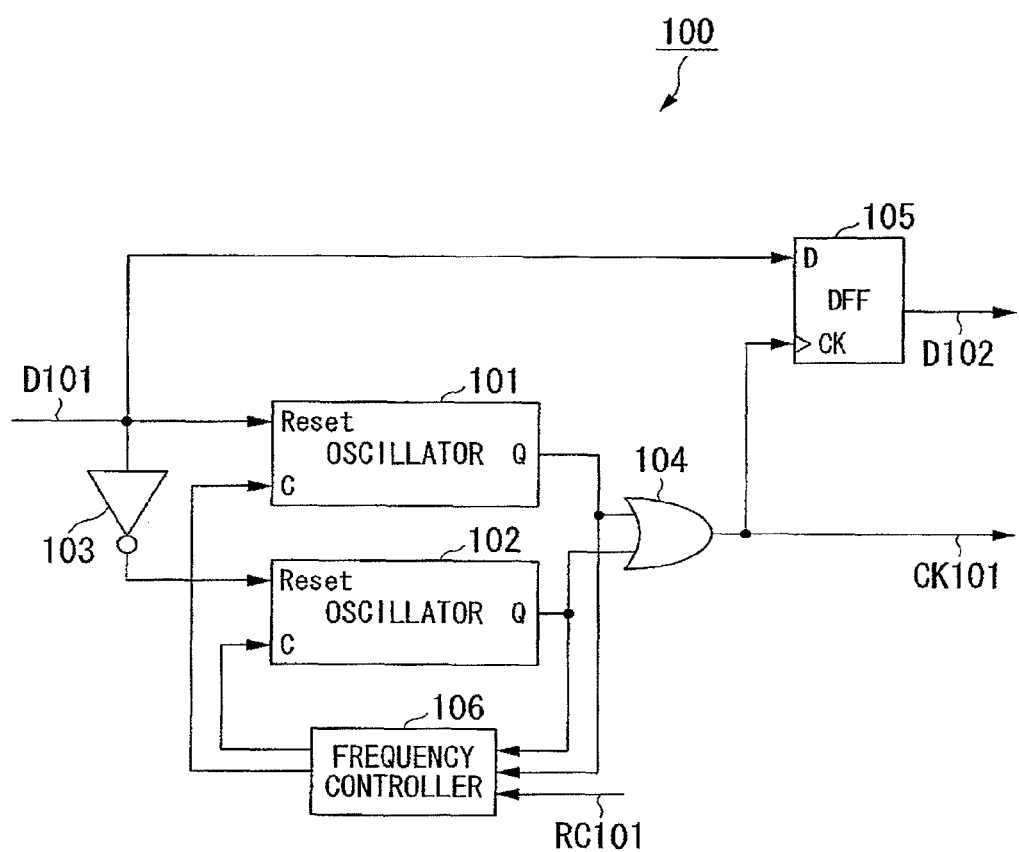
FIG. 5 is a block diagram illustrating the configuration of a conventional clock recovery apparatus.

The clock recovery apparatus 1 of this embodiment includes the series connection of the first and second oscillators 21 and 22 which each output a signal having a predetermined frequency that synchronizes with the input signal being high level. Even if there is a difference in delay between the first and second oscillators 21 and 22, then the clock recovery apparatus 1 is free from the problem with the above-described conventional clock recovery apparatus shown in FIG. 5. The clock recovery apparatus 1 of this embodiment generates the recovery clock CK1 which is continuous and synchronizes with the received data D1 when the received data D1 is high speed. The clock recovery apparatus 1 has stable and high speed performances.

The clock recovery apparatus 1 includes the above-described simplified configuration of the series connection of the first and second oscillators 21 and 22. The simplified configuration may allow scaling down the clock recovery apparatus 1. The simplified configuration may reduce the manufacturing cost and the power consumption. The clock recovery apparatus 1 is operable regardless of whether the received data D1 is high speed at several tends Gbps or low speed at a few Mbps. The clock recovery apparatus 1 can be available to a wide variety of products.

In the embodiment, the first signal S1 output from the inverting output terminal Q-bar of the first oscillator 21 is input into the reset terminal Reset of the second oscillator 22. It is possible as a modification that the signal SO output from, the non-inverting output terminal Q of the first oscillator 21 is input into the second oscillator 22. In this case, the second oscillator 22 is modified to oscillate upon input of the low level signal and not to oscillate upon input of the high level signal.

The term "configured" is used to describe a component, section or part of a device includes hardware and/or software that is constructed and/or programmed to carry out the desired function.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A clock recovery apparatus for generating a recovery clock from received data, the clock recovery apparatus comprising:
a first oscillator that generates a first signal having a first frequency, the first signal synchronizing with the received data when the received data has a first level; and
a second oscillator being connected in series to the first oscillator, the second oscillator generating a second signal as the recovery clock when the first signal has a second level, the second signal having a second frequency, the second signal synchronizing with the first signal,
wherein the first oscillator comprises a first ring oscillator with a first reset terminal which receives an input of the received data, and the second oscillator comprises a second ring oscillator with a second reset terminal which receives an input of a third signal that is output from an inverting output terminal of the first oscillator.

2. The clock recovery apparatus according to claim 1, wherein the second frequency is identical with the first frequency.

3. The clock recovery apparatus according to claim 1, further comprising:
a frequency divider that divides the frequency of the received data at a dividing ratio, the frequency divider supplying the received data of the divided frequency to the first oscillator; and
a multiplier that multiplies the second signal at a multiplying ratio which is decided depending upon the dividing ratio.

4. The clock recovery apparatus according to claim 1, wherein the first and second frequencies are equal to or higher than a third frequency that is obtained by dividing the frequency of the received data by the dividing ratio.

5. The clock recovery apparatus according to claim 1, further comprising:
a frequency controller that controls the frequency of each of the first and second signals based on the second signal and a reference clock that is externally given.

6. A clock recovery apparatus for generating a recovery clock from received data, the clock recovery apparatus comprising:
a first oscillator that includes a first input terminal, a second input terminal, a first non-inverting output terminal, and a first inverting output terminal, the first input terminal being a reset terminal, the received data being input to the first input terminal, a control signal from a frequency controller is input to the second input terminal, the first inverting output terminal outputting a first signal synchronizing with the received data;
a second oscillator that includes a third input terminal, a fourth input terminal, a second non-inverting output terminal, and a second inverting output terminal, the third input terminal being a reset terminal, the first signal from the first oscillator is input to the third input terminal, the control signal from the frequency controller is input to the fourth input terminal, the second non-inverting output terminal outputting a second signal as the recovery clock, the second signal synchronizing with the first signal; and
the frequency controller that receives the second signal from the second oscillator and a reference clock signal that is externally given, the frequency controller outputting the control signal based on the second signal and the reference clock signal.

7. The clock recovery apparatus according to claim 6, wherein the second frequency is identical with the first frequency.

8. The clock recovery apparatus according to claim 6, further comprising:

a frequency divider that divides the frequency of the received data at a dividing ratio, the frequency divider supplying the received data of the divided frequency to the first oscillator; and a multiplier that multiplies the second signal at a multiplying ratio which is decided depending upon the dividing ratio.

9. The clock recovery apparatus according to claim 6, wherein the first and second frequencies are equal to or higher than a third frequency that is obtained by dividing the frequency of the received data by the dividing ratio.

* * * * *